(12) United States Patent
Wenzel

(10) Patent No.: US 11,718,160 B2
(45) Date of Patent: Aug. 8, 2023

(54) VEHICLE ROOF HAVING AN ADJUSTABLE COVER

(71) Applicant: Webasto SE, Stockdorf (DE)

(72) Inventor: Reinhard Wenzel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 26 days.

(21) Appl. No.: 17/437,776

(22) PCT Filed: Apr. 2, 2020

(86) PCT No.: PCT/EP2020/059371
§ 371 (c)(1),
(2) Date: Sep. 9, 2021

(87) PCT Pub. No.: WO2020/201408
PCT Pub. Date: Oct. 8, 2020

(65) Prior Publication Data
US 2022/0153101 A1    May 19, 2022

(30) Foreign Application Priority Data

Apr. 3, 2019   (DE) ...................... 10 2019 002 422.2

(51) Int. Cl.
*B60J 7/047*    (2006.01)
*B60J 7/05*     (2006.01)
(Continued)

(52) U.S. Cl.
CPC ............. *B60J 7/024* (2013.01); *B60J 7/0435* (2013.01); *B60J 7/05* (2013.01); *B60J 10/82* (2016.02)

(58) Field of Classification Search
CPC ................................ B60J 7/0435; B60J 7/024
(Continued)

(56) References Cited

U.S. PATENT DOCUMENTS 4,893,869 A * 1/1990 Fuerst .................... B60J 7/0435
                                                         296/216.03
6,270,154 B1   8/2001 Farber
(Continued)

FOREIGN PATENT DOCUMENTS

DE          19924792 C1    8/2000
DE      202005006879 U1    8/2006
(Continued)

OTHER PUBLICATIONS

International Search Report for PCT/EP2020/059371 dated Jun. 30, 2020, in English and German (6 pages).
(Continued)

*Primary Examiner* — Dennis H Redder
(74) *Attorney, Agent, or Firm* — Fitch, Even, Tabin & Flannery, LLP

(57) ABSTRACT

A vehicle roof having a cover which is movably mounted on the vehicle roof by a bearing mechanism and is adjustable between a closed and a ventilation position in which at least the rear cover edge is raised, the cover being adjustable by the bearing mechanism in such a way that, in the closed position of the cover, the rear cover edge assumes a defined vertical position relative to a roof area portion which adjoins the roof opening or the cover in the region of the rear cover edge, wherein, according to the invention, the cover in its closed position rests on at least one supporting element which is held fixedly on the roof side in a position central with respect to the roof opening and below the rear cover edge and which supporting element holds the cover in its defined vertical position relative to the roof area portion.

9 Claims, 5 Drawing Sheets

(51) Int. Cl.
    *B60J 7/02* (2006.01)
    *B60J 10/82* (2016.01)
    *B60J 7/043* (2006.01)

(58) Field of Classification Search
    USPC .............................. 296/216.01–9, 221, 223
    See application file for complete search history.

(56) References Cited

U.S. PATENT DOCUMENTS

2008/0197675 A1    8/2008  Nolles
2014/0054930 A1    2/2014  Kanai

FOREIGN PATENT DOCUMENTS

| DE | 10 2007 008821 A1 | 8/2008 |
| DE | 10 2008 017 07 B3 | 7/2009 |
| EP | 3059859 A2 | 9/1982 |
| EP | 2017109 A1 | 1/2009 |
| JP | S62167730 U | * 10/1987 |

OTHER PUBLICATIONS

Search Report from corresponding German Patent Application No. 10 2019 002 422.2; dated Jan. 14, 2020 in German with English machine translation (13 pages)(previously cited without translation).

* cited by examiner

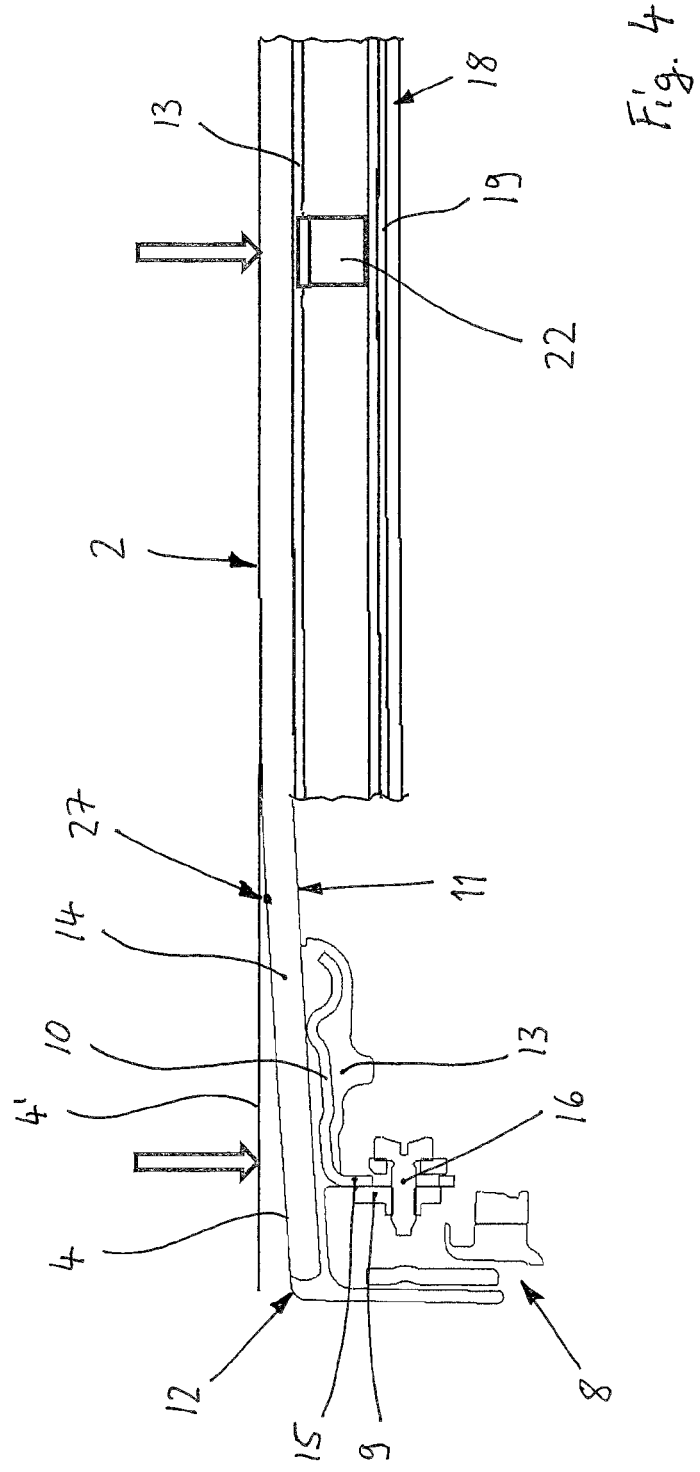

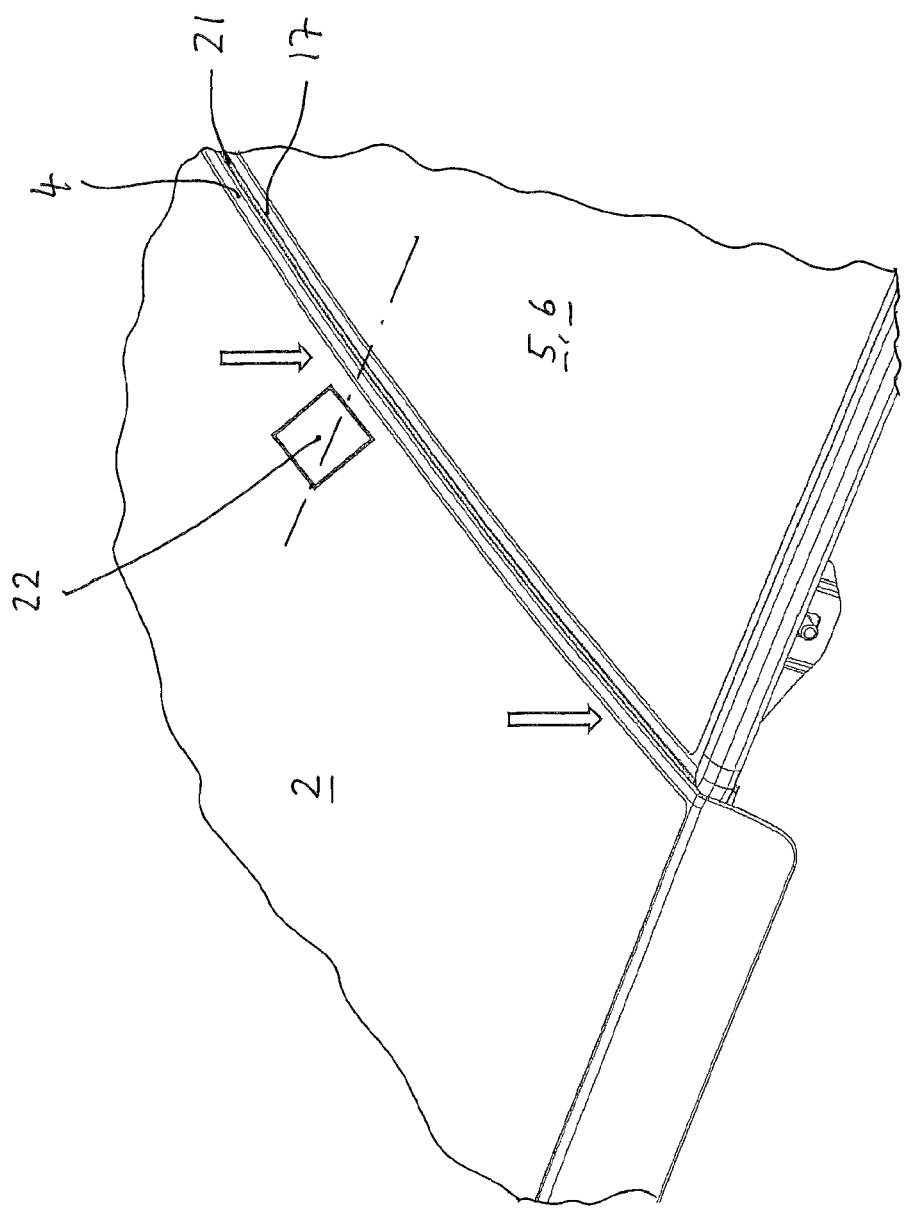

VEHICLE ROOF HAVING AN ADJUSTABLE COVER

CROSS-REFERENCE TO RELATED APPLICATION

This application is a U.S. national phase application filed under 35 U.S.C. § 371 of International Application No. PCT/EP2020/059371, filed Apr. 2, 2020, designating the United States, which claims priority from German Patent Application Number DE 10 2019 002 422.2, filed Apr. 3, 2019, which is hereby incorporated herein by reference in its entirety for all purposes.

FIELD

The invention relates to a vehicle roof having a cover that is mounted in a movable manner on the vehicle roof by means of a bearing mechanism and is adjustable between a closed position in a roof opening and a ventilation position at least with its cover rear edge raised, wherein the cover is settable by means of the bearing mechanism in such a way that, in the closed position of the cover, the cover rear edge takes up a defined height position relative to a roof surface part which adjoins the roof opening in the region of the cover rear edge.

BACKGROUND

DE 10 2008 017 074 B3 discloses a vehicle roof of the type in question, having a cover arranged in a roof opening. The cover has, on its underside, in the region of each of its two side edges, a longitudinally extending riblike flange of a cover inner panel, which is connected via a plurality of screw connections to a cover carrier which is both assigned to the flange and movably connected to a roof frame via a bearing mechanism. A screw hole is provided in each of the flange and the cover carrier for screwing them together. The two screw holes are arranged in a manner aligned with one another at the screw-connection points and are passed through by a screw. The two screw holes have diameters such that fine adjustment of the cover is possible by appropriate positioning of the flange relative to the cover carrier.

The setting of the cover with its cover rear edge into a defined height position relative to the adjoining roof surface part takes place for example at two setting points that are arranged on both sides of the cover longitudinal center line and are spaced apart therefrom. Production-related component tolerances of the cover, in particular of a glass cover, and of the adjoining roof surface part, for example of a further glass cover, can impair a uniform and thus visually high-quality profile of the cover rear edge at the front edge of the adjoining roof surface part or glass cover.

Therefore, the invention is based on the object of creating a vehicle roof of the type mentioned at the beginning that allows improved setting of the cover relative to an adjoining roof surface part.

SUMMARY

This object is achieved according to the invention in the case of the vehicle roof mentioned at the beginning in that the cover rests, in its closed position, on at least one supporting element which is held in a fixed position on the roof, under the cover rear edge, in a central position with respect to the roof opening, and which keeps the cover in its defined height position relative to the roof surface part.

Advantageous configurations of the vehicle roof according to the invention are specified in the dependent claims.

The central rigid support of the cover by means of the at least one supporting element provides central height adjustment of the cover rear edge in the intended orientation with respect to the adjoining roof surface part. Production-related tolerances or dimensional deviations in particular in the profile of the cover rear edge are therefore able to be made up for at least at the position of the supporting element. A flexible cover seal, which extends along the cover edge and against which the cover bears in its closed position, does not form such a size-limited support.

Two or more supporting elements can be arranged for example in a longitudinal direction one after another or in a transverse direction alongside one another, wherein they are arranged in or close to a vertical longitudinal center plane of the cover or of the roof and of the roof opening.

Expediently, the cover comprises, on its cover underside, a contact face for resting on the supporting element. The contact face is arranged in the middle of the cover and next to the cover rear edge. The contact face is arranged in particular at a foamed-on edge structure of the cover. The contact face can also be formed at a contact-face part attached to the cover or to the foamed-on edge structure. The foamed-on edge structure is for example a polyurethane foamed-on structure. If, for example, two supporting elements are provided, a contact face can be formed for each supporting element. On the other hand, a common contact face for two or more supporting elements can also be provided.

The at least one supporting element can be arranged at the roof surface part or at a roof frame fixed to the roof. When the supporting element is arranged at the roof surface part, the latter expediently contains a holder or support device for the supporting element, said holder or support device extending forward from the roof surface part into the roof opening such that the closed cover can rest on the supporting element.

The supporting element is for example a plastics part and can be formed for example by an upright cylindrical part or by a square or rectangular part. If a plurality of supporting elements are provided, these can be formed in the same way or differently.

In a preferred design, the roof surface part is a second cover or additional cover that adjoins the cover rear edge of the cover or of the first or front cover. Such an openable roof is in particular a panoramic roof with two glass covers arranged one after another, of which at least the front cover is adjustable at least into a ventilation position with a cover rear edge that is pivoted out.

Expediently, the additional cover contains, on its cover front edge, a foamed-on structure, a leg of which engages beneath the cover rear edge of the cover. The supporting element is firmly attached to the leg. The leg forms or contains for example a gully that discharges penetrated water to the side.

In a preferred design, the supporting element is produced from low-friction material, in particular from a low-friction plastic. On the other hand, the supporting element can have an antifriction layer on which the cover rests. As a result of the improved sliding properties, rubbing or creaking noises can be avoided during relative movements or twisting movements of the cover relative to the roof surface part or to the supporting element.

According to a preferred configuration, the cover is mounted in a movable manner on the vehicle roof by means of the two bearing devices or bearing mechanisms assigned to its two side edges and is kept in its closed position by means of the two bearing devices or bearing mechanisms upon abutment against the at least one supporting element in a concavely curved and elastically deformed installation position. In this way, a defined height position of the cover rear edge can be set at a further setting point away from the middle of the cover and toward the cover side edge. The setting or adjustment takes place for example by way of a screw connection of a cover inner panel or cover inner profile to a cover carrier that is supported on the roof frame via the bearing mechanism.

BRIEF DESCRIPTIONS OF THE DRAWINGS

In the following text, the invention is explained in more detail on the basis of an exemplary embodiment of a vehicle roof according to the invention with reference to the drawing, in which:

FIG. 4 shows a view in cross section of the cover arranged in the closed position with its cover rear edge resting on the supporting element; and FIG. 5 shows an isometric view of the cover arranged in the closed position, the cover rear edge of which is positioned relative to an adjoining roof surface part.

DETAILED DESCRIPTION

Figure 1:
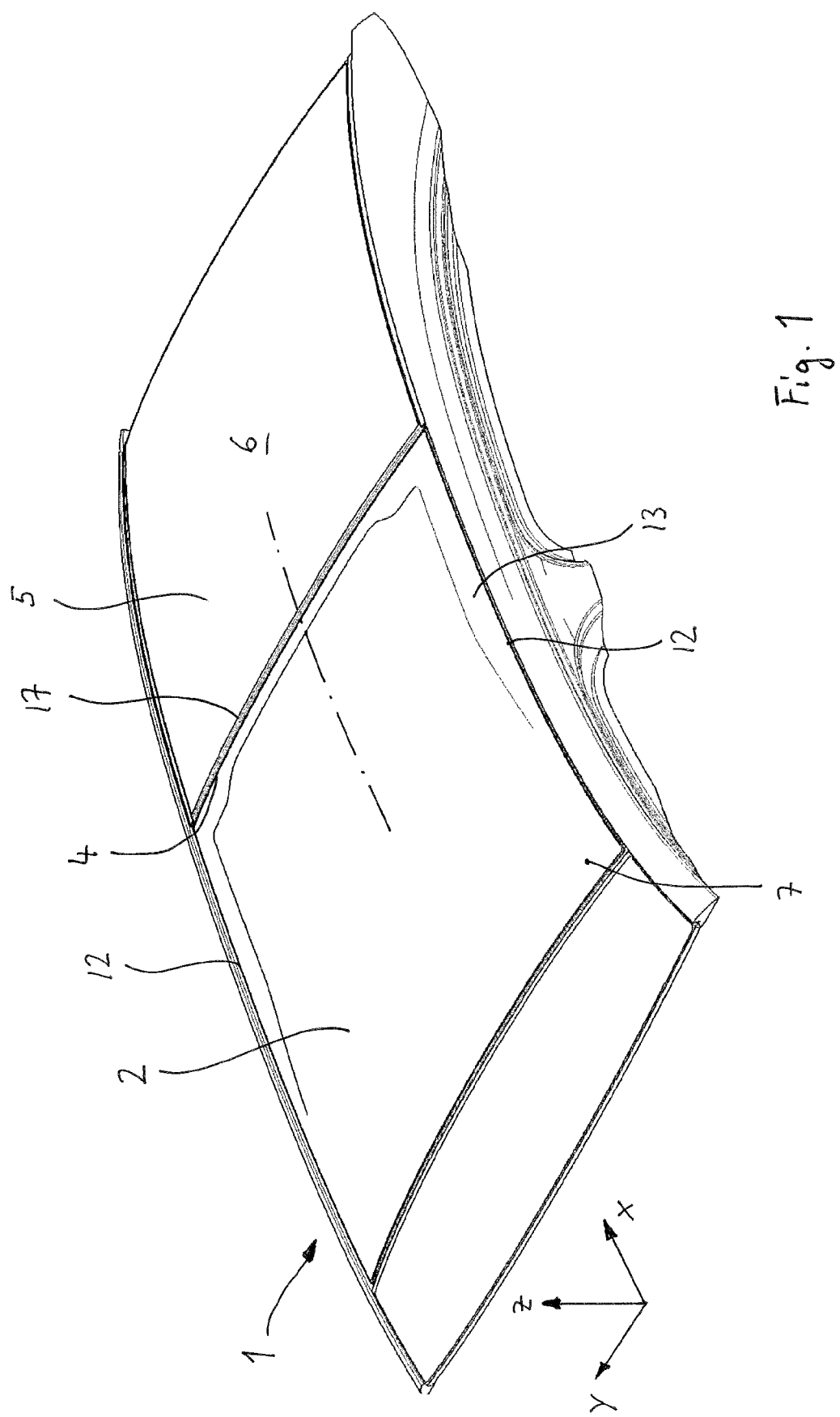
FIG. 1 shows an isometric view of an openable vehicle roof with a cover that is arranged in a roof opening in the closed position.
Figure 2:
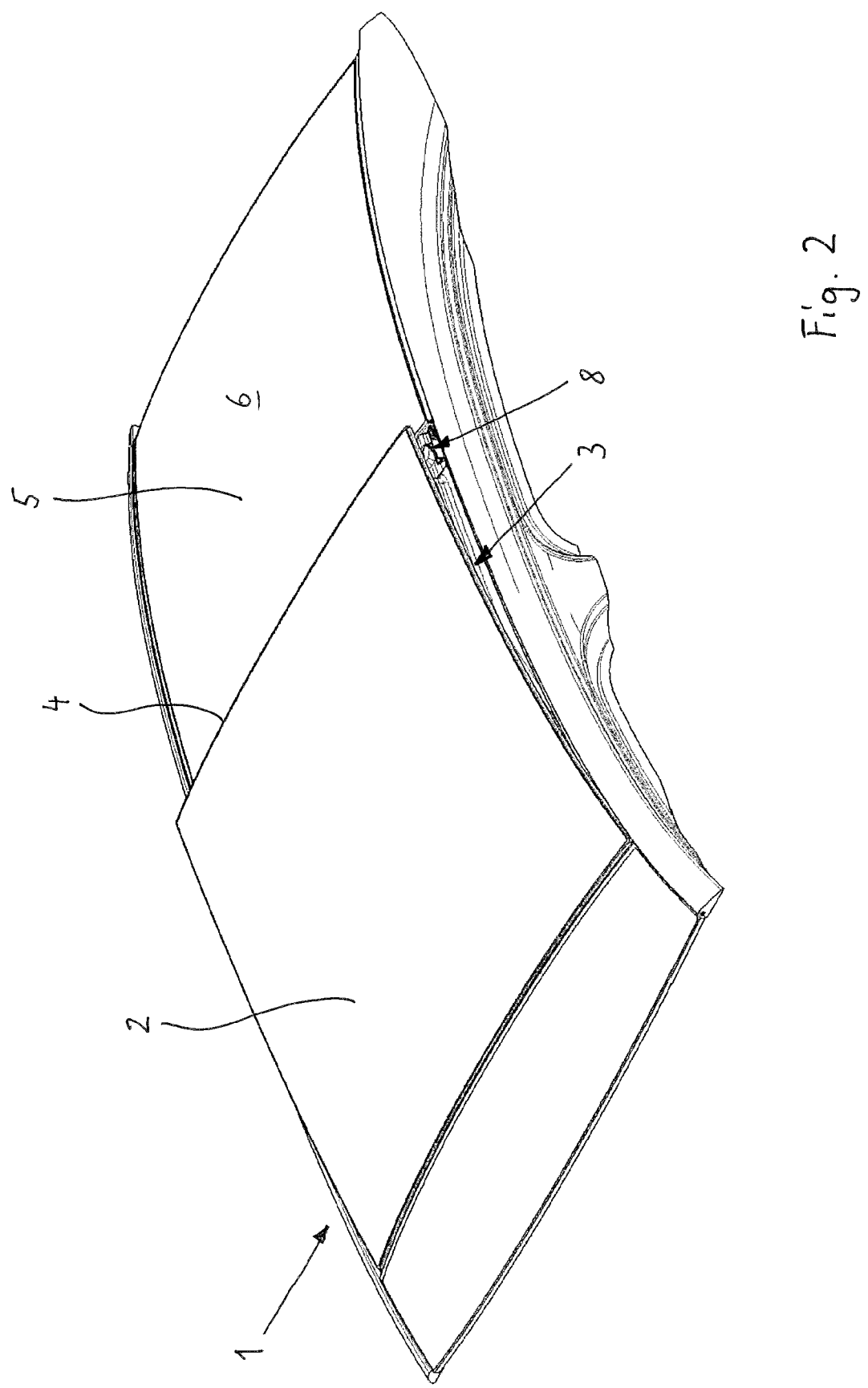
FIG. 2 shows an isometric view of the openable vehicle roof in FIG. 1, wherein the cover has been pivoted out at its rear edge into a ventilation position.
Figure 3:
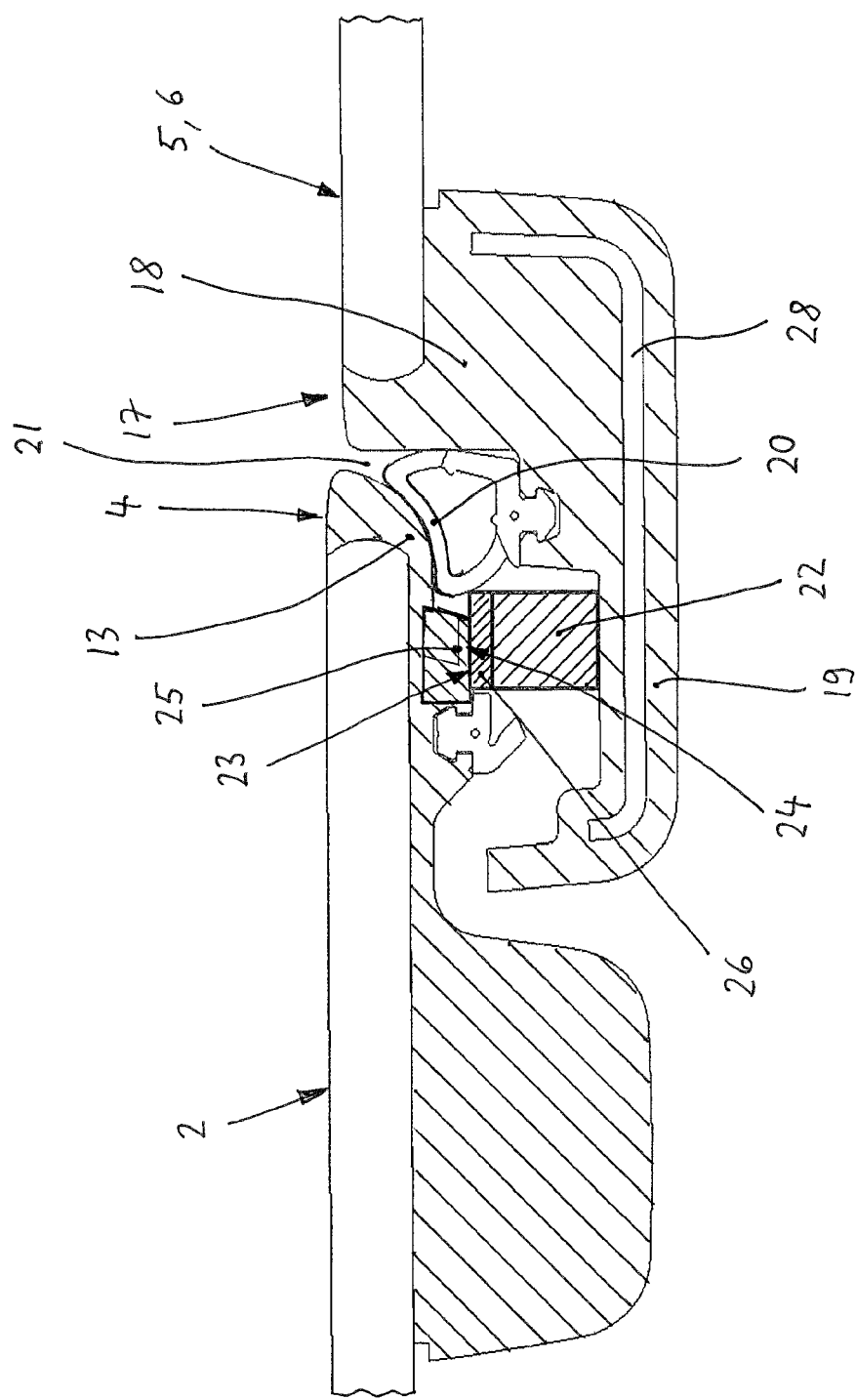
FIG. 3 shows a view in longitudinal section, in a vertical longitudinal center plane of the cover arranged in the closed position, of the cover rear edge resting on a supporting element.

An openable vehicle roof 1 of a vehicle, for example of a passenger car, has a cover 2, which is able to be raised out of a closed position covering or closing a roof opening 3 (FIGS. 1 and 5) and is adjustable into a ventilation position (see FIG. 2) with the cover rear edge 4 raised. From this ventilation position, the cover 2 is movable, with its raised cover rear edge 4, over a roof surface part 5 that adjoins to the rear of the roof opening 3 in the vehicle or roof longitudinal direction into an open position. The roof surface part 5 is a rear cover or additional cover 6 in the exemplary embodiment illustrated. Such a roof is an externally guided sunroof. The rear roof surface part 5 can be formed in principle as a fixed roof surface or with a movable roof part. Both the front cover 2 and the rear additional cover 6 are in particular glass covers. The axis and direction designations used in the description, for example "front" and "rear", "top" and "bottom", "external" and "internal", "horizontal" and "vertical" and also "lateral", "transverse" and "longitudinal", or in a transverse direction or y direction and in a longitudinal direction or x direction, relate to a three-dimensional x-y-z vehicle coordinate system.

The cover 2 is movable along a lateral longitudinal guide, arranged on the roof, for example a guide rail, on both sides of the roof opening 3 in each case by means of a front bearing device arranged under its front region 7, and is able to be pivoted out into its ventilation or spoiler position (see FIG. 2) by means of a rear bearing mechanism 8, and, in the pivoted-out position, is movable toward the rear along the guide rail over the rear roof surface part 5 or the additional cover 6. The roof structure is largely symmetric with respect to a vertical longitudinal center plane of the vehicle roof 1 (in the figures, a dot-dash line indicates the position of the longitudinal center plane), and so the following description is given by way of the components and bearing mechanism 8 arranged on the left-hand longitudinal side of the roof opening 3.

The rear bearing mechanism 8 has a tilt lever, which is mounted in a movable manner on a slide mounted on the guide rail and is also articulated to a cover carrier 9. In its front region, the cover carrier 9 is supported on the roof or on the guide rail in a movable manner via the front bearing mechanism and is able to be raised and lowered by the tilt lever in its rear portion.

The cover 2 has a cover panel or cover inner profile 10 (FIG. 4), which is arranged on the cover underside 11 on the inward side of the cover side edge 12 and extends along the cover side edge 12. The cover inner profile 10 is fastened for example by means of a foamed-on edge structure 13 which is formed on the cover 2 on the cover underside 11 in particular in the form of a peripheral strip and in which the cover inner profile 10 is embedded. The foamed-on edge structure 13 is expediently produced from a plastic such as polyurethane. The foamed-on edge structure 13 can also form the cover side edge 12 and also the cover rear edge 4 by engaging around and covering the edge of a cover plate or cover glass pane 14 of the cover 2.

The cover inner profile 10 has an angled profile flange 15, which extends downward from the cover underside 11 and which is attached to the cover carrier 9 such that the cover 2 is mounted on the vehicle roof in a movable manner via the bearing device and the bearing mechanism.

The profile flange 15 is preferably connected to the cover carrier 9 via a plurality of connections. The cover 2 is attached to the cover carrier 9 via the connections such that, in its closed position, it is fitted on or in the roof opening 3 and is arranged in particular with its cover rear edge 4 in a defined height position relative to the adjoining roof surface part 5 or the additional cover 6.

A screw connection 16 (see FIG. 4) forms a rear connection, which is provided on the cover carrier 9 or on the cover inner profile 10 in a rear portion of the cover 2 or in the region close to the cover rear edge 4.

The roof surface part 5 or the additional cover 6 has, at its front edge 17, a foamed-on structure 18, which comprises a forwardly directed leg 19 that engages beneath the cover 2 at its cover rear edge 4 and expediently forms a gully. Arranged at the foamed-on structure 18 is a seal 20, which extends at least along the front edge 17 of the additional cover 6 and which rests in a sealing manner against the foamed-on edge structure 13, attached to the cover rear edge 4, of the cover 2 arranged in its closed position in the roof opening 3. Thus, a gap 21 between the cover 2 and the roof surface part 5 or the additional cover 6 is sealed off on the underside or inwardly of the roof.

Arranged on the leg 19 of the foamed-on structure 18 is a supporting element 22. The supporting element 22 is arranged on the leg 19 centrally in the transverse direction with respect to the roof surface part 5 or the additional cover 6 and thus also with respect to the cover 2 and also in the middle between the two lateral bearing mechanisms 8. The supporting element 22 is positioned on the leg 19 in front of the seal 20. With the cover 2 closed, a top-side resting face 23 of the supporting element 22 is in contact with a contact face 24 that is provided on the underside of the foamed-on edge structure 13 so as to be assigned to the supporting element 22. The contact face 24 is formed on the foamed-on edge structure 13 itself or on a contact face part 25 attached thereto.

The supporting element 22 (illustrated only schematically in FIG. 5) is for example a part that is cylindrical or square in horizontal cross section, or an elongate weblike part. In any case, it is restricted in terms of size to the middle or a central region on the vertical longitudinal center plane of the cover 2 or roof surface part 5 or of the roof opening 3 and does not extend along a very long length in the transverse direction along the cover rear edge 4.

The supporting element 22 is produced from a low-friction material in order to avoid friction between its top-side resting face 23 and the contact face 24 on the cover 2 and disruptive noise possibly resulting therefrom if small relative movements such as twisting movements between the cover 2 and the roof surface part 5 arise during operation. The supporting element 22 can also have an antifriction layer 26 which forms the top-side resting face 23. The contact face 24 is likewise formed from an antifriction material or provided with an antifriction coating.

The supporting element 22 has such a height that its top-side resting face 23 keeps the cover 2, supported thereon, with its cover rear edge 4 in a defined height position relative to the roof surface part 5 or additional cover 6. This positioning at exactly or approximately the same height is set by the supporting element 22 in the middle of the cover rear edge 4. Positioning at approximately the same height can be formed in the manner of imbrication in which the cover 2 protrudes slightly beyond the adjoining roof surface part 5 in the height direction. The supporting element 22 thus forms a locally limited rigid support for the cover 2, which otherwise rests on the flexibly resilient seal 20.

In an alternative design, it is also possible for two or more supporting elements 22 to be provided (not illustrated), which are expediently arranged in a locally limited position with respect to the middle of the cover rear edge 4.

Furthermore, the cover 2 can be set by means of the two lateral bearing devices or bearing mechanisms 8 for example by the respective adjustable screw connection 16 in such a way that the cover rear edge 4—while the cover 2 is resting in a supporting manner on the supporting element 22—is set in its intended height position relative to the adjoining roof surface part 5 at for example two further setting points 27, which are each arranged between the cover middle and the cover side edge 12 or the lateral bearing mechanism 8 (one setting point 27 is illustrated by way of example in FIG. 4). The accordingly set cover 2 is elastically deformed, in its closed position, from its production shape (schematically illustrated in FIG. 4 by way of the undeformed cover rear edge 4') into a preloaded installation position, concavely curved with respect to the supporting element 22, with the cover rear edge 4 lowered on both sides (see FIG. 4).

The foamed-on structure 18 on the rear additional cover 6 can have a reinforcing profile 28 that reinforces in particular the leg 19 and thus forms a stable support base for the supporting element 22. The reinforcing profile 28 extending along the front edge 17 of the additional cover 6 can also reinforce the additional cover 6 itself against undesired deformation. Such a reinforcing profile 28 can also be provided on a roof frame, fixed to the roof, under the rear edge of the roof opening 3.

The openable vehicle roof 1 is in particular a panoramic roof with two glass covers arranged one behind the other, of which at least the front cover 2 is mounted in a movable manner on the vehicle roof.

| List of reference signs | |
|---|---|
| 1 | Vehicle roof |
| 2 | Cover |
| 3 | Roof opening |
| 4 | Cover rear edge |
| 5 | Roof surface part |
| 6 | Additional cover |
| 7 | Front region |
| 8 | Bearing mechanism |
| 9 | Cover carrier |
| 10 | Cover inner profile |
| 11 | Cover underside |
| 12 | Cover side edge |
| 13 | Foamed-on edge structure |
| 14 | Cover glass pane |
| 15 | Profile flange |
| 16 | Screw connection |
| 17 | Front edge |
| 18 | Foamed-on structure |
| 19 | Leg |
| 20 | Seal |
| 21 | Gap |
| 22 | Supporting element |
| 23 | Resting face |
| 24 | Contact face |
| 25 | Contact face part |
| 26 | Antifriction layer |
| 27 | Setting point |
| 28 | Reinforcing profile |

The invention claimed is:

1. A vehicle roof having a cover that is mounted in a movable manner on the vehicle roof by a bearing mechanism and is adjustable between a closed position in a roof opening and a ventilation position at least with its cover rear edge raised, wherein the cover is settable by the bearing mechanism in such a way that, in the closed position of the cover, the cover rear edge takes up a defined height position relative to a roof surface part which adjoins the roof opening or the cover in the region of the cover rear edge, wherein the cover rests, in its closed position, on at least one supporting element which is held in a fixed position on the roof, under the cover rear edge, in a central position with respect to the roof opening, and which keeps the cover in its defined height position relative to the roof surface part; and
   wherein the cover is mounted in a movable manner on the vehicle roof by the bearing mechanism assigned to its two side edges, and is kept in its closed position by the bearing mechanisms upon abutment against the supporting element in a concavely curved and elastically deformed installation position.

2. The vehicle roof as claimed in claim 1, wherein the cover has, on its cover underside, a resting face for resting on the supporting element, and in that the resting face is arranged in the middle of the cover and next to the cover rear edge.

3. The vehicle roof as claimed in claim 2, wherein the resting face is arranged at a foamed-on edge structure of the cover.

4. The vehicle roof as claimed in claim 1, wherein the supporting element is arranged at the roof surface part or at a roof frame fixed to the roof.

5. The vehicle roof as claimed in claim 4, wherein the roof surface part is an additional cover that adjoins the cover rear edge of the cover.

6. The vehicle roof as claimed in claim 5, wherein the additional cover has, on its cover front edge, a foamed-on structure, a leg of which engages beneath the cover rear edge of the cover, at which the supporting element is arranged.

7. The vehicle roof as claimed in claim 1, wherein the supporting element is produced from low-friction material or has an antifriction layer on which the cover rests.

8. The vehicle roof as claimed in claim 1, wherein the supporting element forms a locally delimited rigid support for the cover.

9. The vehicle roof as claimed in claim 1, wherein the setting or adjustment of the cover into its concavely curved preloaded installation position takes place at a screw connection of a cover inner panel or cover inner profile to a cover carrier that is supported on a roof frame via the bearing mechanism.

* * * * *